US012605624B2

(12) United States Patent
Yang et al.

(10) Patent No.: US 12,605,624 B2
(45) Date of Patent: Apr. 21, 2026

(54) METHOD FOR GAME DATA ACCELERATION AND SYSTEM, AND ELECTRONIC DEVICE

(71) Applicant: NETEASE (HANGZHOU) NETWORK CO., LTD., Hangzhou (CN)

(72) Inventors: Jieyang Yang, Hangzhou (CN); Zhe Zhou, Hangzhou (CN); Zheng Lin, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 357 days.

(21) Appl. No.: 18/041,549

(22) PCT Filed: Feb. 22, 2021

(86) PCT No.: PCT/CN2021/077310
§ 371 (c)(1),
(2) Date: Feb. 14, 2023

(87) PCT Pub. No.: WO2022/099946
PCT Pub. Date: May 19, 2022

(65) Prior Publication Data
US 2023/0321530 A1      Oct. 12, 2023

(30) Foreign Application Priority Data

Nov. 10, 2020    (CN) .......................... 202011245582.1

(51) Int. Cl.
*A63F 13/31*          (2014.01)
*H04L 43/026*         (2022.01)

(52) U.S. Cl.
CPC ............ *A63F 13/31* (2014.09); *H04L 43/026* (2013.01)

(58) Field of Classification Search
CPC ... A63F 13/77; A63F 13/358; A63F 2300/534
See application file for complete search history.

(56) References Cited

U.S. PATENT DOCUMENTS

| | | | | |
|---|---|---|---|---|
| 10,812,366 B1 * | 10/2020 | Berenberg | .......... | H04L 67/1014 |
| 11,025,528 B1 * | 6/2021 | Rothschild | .......... | G06F 9/45558 |

(Continued)

FOREIGN PATENT DOCUMENTS

| | | |
|---|---|---|
| CN | 103957208 A | 7/2014 |
| CN | 104580192 A | 4/2015 |

(Continued)

OTHER PUBLICATIONS

1st Office Action dated May 21, 2022 of Chinese Application No. 202011245582.1.

(Continued)

*Primary Examiner* — Nicholas P Celani
*Assistant Examiner* — Wuji Chen
(74) *Attorney, Agent, or Firm* — Qinghong Xu

(57)          ABSTRACT

A method for game data acceleration, includes: obtaining game information in a game host device by an accelerator client, the game information including a game server IP and a port number, where an electronic device and the game host device are located in the same network; establishing a corresponding game data monitoring interface according to the IP and the port number of the game server, and monitoring, by the game data monitoring interface, network data that is sent to the electronic device by the game console device; determining, according to a monitoring result, game data to be accelerated corresponding to the game console device; and sending said game data to an acceleration server.

18 Claims, 19 Drawing Sheets

(56)  References Cited

U.S. PATENT DOCUMENTS

| | | | | |
|---|---|---|---|---|
| 11,233,881 | B2 * | 1/2022 | Shribman | H04L 67/1063 |
| 12,095,734 | B1 * | 9/2024 | Engskow | H04L 63/0272 |
| 2002/0080871 | A1 * | 6/2002 | Fallon | H04L 67/55 |
| | | | | 375/240 |
| 2004/0081150 | A1 | 4/2004 | Chiang et al. | |
| 2006/0259579 | A1 * | 11/2006 | Beverly | H04L 67/10 |
| | | | | 709/217 |
| 2007/0027702 | A1 * | 2/2007 | Cox | G06Q 30/0601 |
| | | | | 705/26.1 |
| 2011/0136577 | A1 * | 6/2011 | Dietz | A63F 13/323 |
| | | | | 463/43 |
| 2014/0051497 | A1 * | 2/2014 | Lang | G07F 17/3241 |
| | | | | 463/25 |
| 2016/0344796 | A1 * | 11/2016 | Liu | H04L 67/568 |
| 2018/0255036 | A1 * | 9/2018 | Fiedler | H04L 67/146 |
| 2018/0367648 | A1 * | 12/2018 | Fan | H04L 45/745 |
| 2019/0191125 | A1 * | 6/2019 | Fink | H04N 7/08 |
| 2020/0368616 | A1 * | 11/2020 | Delamont | H04N 13/239 |
| 2022/0334789 | A1 * | 10/2022 | Kamaraju | G11B 27/036 |
| 2023/0232281 | A1 * | 7/2023 | Yan | H04W 28/02 |
| | | | | 370/235 |
| 2023/0232308 | A1 * | 7/2023 | Huang | H04W 24/08 |
| | | | | 370/338 |
| 2023/0275836 | A1 * | 8/2023 | Huang | H04L 45/74 |
| | | | | 370/392 |

FOREIGN PATENT DOCUMENTS

| | | | |
|---|---|---|---|
| CN | 104580192 B | * | 4/2015 |
| CN | 107135249 A | | 9/2017 |
| CN | 107451885 A | | 12/2017 |
| CN | 108881178 A | | 11/2018 |
| CN | 110247824 A | | 9/2019 |
| CN | 112245907 A | | 1/2021 |

OTHER PUBLICATIONS

2rd Office Action dated Aug. 2, 2021 of Chinese Application No. 202011245582.1.
International Search Report dated Aug. 6, 2021 of International Application No. PCT/CN2021/077310.

* cited by examiner

Original traffic

Game client ◄┄┄┄┄┄┄┄┄┄┄┄┄┄┄┄┄► Game server

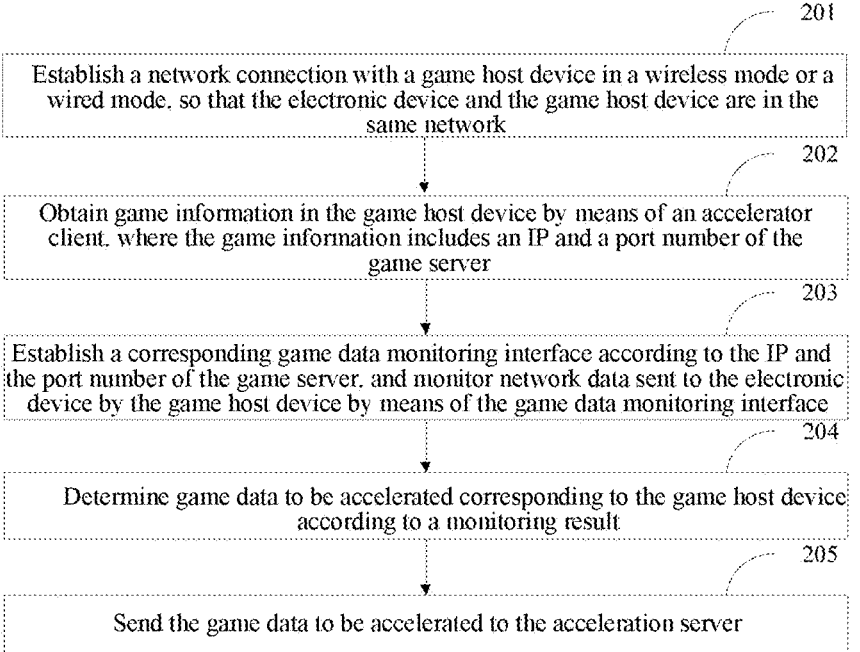

201

Establish a network connection with a game host device in a wireless mode or a wired mode. so that the electronic device and the game host device are in the same network

202

Obtain game information in the game host device by means of an accelerator client. where the game information includes an IP and a port number of the game server

203

Establish a corresponding game data monitoring interface according to the IP and the port number of the game server. and monitor network data sent to the electronic device by the game host device by means of the game data monitoring interface

204

Determine game data to be accelerated corresponding to the game host device according to a monitoring result

205

Send the game data to be accelerated to the acceleration server

FIG.11

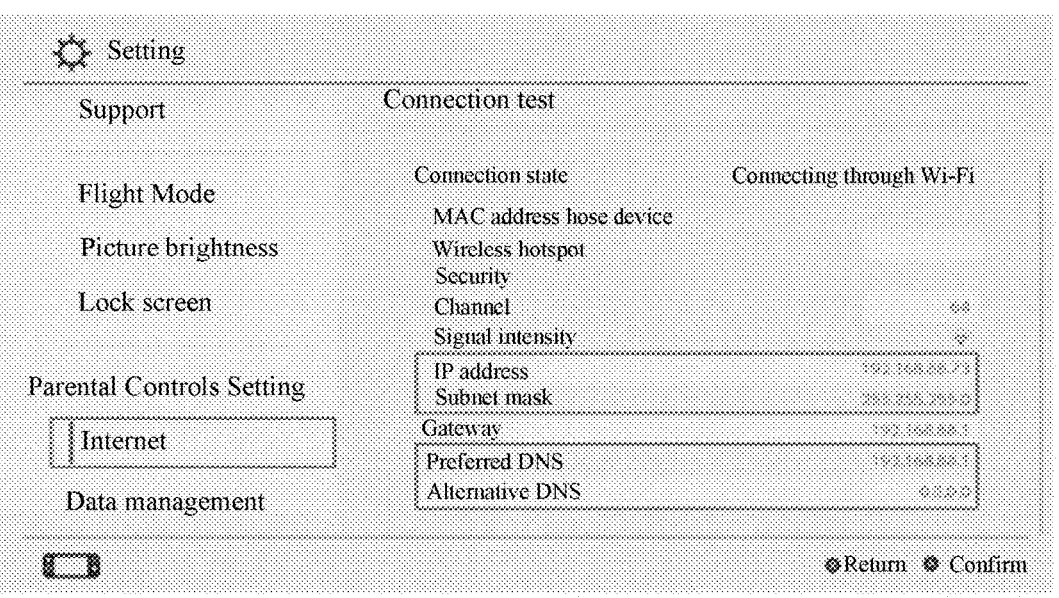

⚙ Setting

Support                    Connection test

Flight Mode                Connection state          Connecting through Wi-Fi
                           MAC address hose device
Picture brightness         Wireless hotspot
                           Security
Lock screen                Channel
                           Signal intensity
                           IP address
Parental Controls Setting  Subnet mask
                           Gateway
Internet                   Preferred DNS
                           Alternative DNS
Data management ⬛                                                    ⊛Return  ⊛ Confirm Perform setting according
to the following steps 1.Set Wi-Fi:ABCDE as follows        LBJ_GTACS300_5G-1
in Switch Internet setting please:
                                    Input password
IP address:10.0.3.233
Subnet mask:255.255.255.0           IP address setting        Manually
Gateway:10.0.3.15
                                    IP address
Preferred DNS:10.0.3.2
                                    Subnet mask
Network proxy:ON
Server address:255.255.255.0        Gateway
Port:1024
                                    Proxy server setting      enable
2.Make sure Switch keeping
connection with Wi-Fi: ABCDE        Server Network connection failed          Port I know      View                 ⬛                        ⊛Return  ⊛Confirm
               the tutorial

FIG.15

METHOD FOR GAME DATA ACCELERATION AND SYSTEM, AND ELECTRONIC DEVICE

CROSS REFERENCE

The present application is a National Stage of International Application No. PCT/CN2021/077310, filed on Feb. 22, 2021, which claims priority to Chinese Patent Application No. 202011245582.1 entitled "Game Data Acceleration Method, Storage Medium, Electronic Device and System", filed on Nov. 10, 2020, and both the entire contents of which are incorporated herein by reference.

TECHNICAL FIELD

The present disclosure relates to the field of computer technology, and in particular, to the field of network game acceleration, specifically to a method for game data acceleration, a storage medium, an electronic device, and a system.

BACKGROUND

With the development of computers and network technologies, network games are increasingly favored by game players. The current game host device can be applied to a computer, and can also be applied to a mobile terminal device such as a mobile phone and a tablet. The network performance of the game host device is an important factor that affects the user experience of the network game, and how to improve the network performance of the game host device has become an important research topic in the industry.

It should be noted that the information disclosed in the above background part is only used to enhance the understanding of the background of the present disclosure, and therefore may include information that does not constitute the prior art known to those of ordinary skill in the art.

SUMMARY

According to embodiments of the present disclosure, there is provided a method for game data acceleration, applied to an electronic device, the electronic device is configured with an accelerator client, the method comprises:

obtaining game information in a game host device by the accelerator client, the game information comprising an IP and a port number of a game server, wherein the electronic device and the game host device are in a same network;

establishing a corresponding game data monitoring interface according to the IP and the port number of the game server, and monitoring network data sent to the electronic device by the game host device by the game data monitoring interface;

determining game data to be accelerated corresponding to the game host device according to a monitoring result; and sending the game data to be accelerated to an acceleration server According to embodiments of the present disclosure, there is provided an electronic device including a memory and a processor, a computer program is stored in the memory, and the processor executes steps in the method for game data acceleration according to any one of the embodiments by invoking the computer program stored in the memory.

According to embodiments of the present disclosure, there is provided a system for game data acceleration including a mobile phone, a game host device, an acceleration server and a game server;

the mobile phone is configured to perform obtaining game information in the game host device, the game information comprising an IP and a port number of the game server, and the mobile phone and the game host device are in a same network;

the mobile phone is configured to perform starting an accelerator client configured in the mobile phone to establish a corresponding game data monitoring interface according to the IP and the port number of the game server, and monitoring network data sent to the mobile phone by the game host device by the game data monitoring interface;

the mobile phone is configured to perform determining game data to be accelerated corresponding to the game host device according to a monitoring result;

the mobile phone is configured to perform sending the game data to be accelerated to the acceleration server;

the acceleration server is configured to perform acceleration on the game data to be accelerated, and transmit the accelerated game data to the game server; and the game host device is configured to perform uploading the network data to the mobile phone and to receive acceleration traffic returned by the game server in response to the accelerated game data by the mobile phone.

It should be understood that the above general description and the following detailed description are exemplary and explanatory only and are not intended to limit the present disclosure.

BRIEF DESCRIPTION OF THE DRAWINGS

In order to illustrate the technical solutions in the embodiments of the present disclosure more clearly, the accompanying drawings that need to be used in the description of the embodiments are briefly described below, and it is obvious that the drawings in the following description are merely some embodiments of the present disclosure, and for those skilled in the art, other drawings can be obtained according to these drawings without involving any inventive effort.

FIG. 11 is another schematic flowchart of a method for game data acceleration method according to an embodiment of the present disclosure.

FIG. 15 is a schematic diagram of an eighth application scenario of a method for game data acceleration according to an embodiment of the present disclosure.

DETAILED DESCRIPTION

The technical solutions in the embodiments of the present disclosure will be clearly and completely described below with reference to the accompanying drawings in the embodiments of the present disclosure. Obviously, the described embodiments are only part of the embodiments of the present disclosure, not all of the embodiments. All other embodiments obtained by those skilled in the art based on the embodiments of the present disclosure without creative efforts fall within the protection scope of the present disclosure.

The technical difficulty to be primarily solved in the present disclosure is to hijack the traffic of a game host device. In a conventional manner, the application program of the mobile terminal of the Android system or the IOS system cannot hijack the traffic of the hotspot in a mobile phone hotspot manner, while the VPN program on the mobile phone belongs to the TUN virtual network card, and the TUN virtual network card and the network card sharing the hotspot are independent of each other. In the case of Root, the Android system may use a system IP forwarding policy to implement data forwarding between network cards. But, as the limitation of Root is too large, most models of the Android system cannot achieve data forwarding between the network cards, and the difficulty of jailbreak for the IOS system is greater. Therefore, the embodiments of the present disclosure provide a method for game data acceleration, a storage medium, an electronic device, and a system. A analog game server of a game host device is forged to intercept traffic into a program of a VPN, then forward processing is performed, and finally, the real data is returned to the game host device, thus achieving the purpose of traffic hijacking and forwarding.

Embodiments of the present disclosure provide a method for game data acceleration, a storage medium, an electronic device, and a system. Specifically, the method for game data acceleration in the embodiments of the present disclosure may be executed by an electronic device, where the electronic device may be a terminal or a server or the like. The terminal may be a terminal device such as a smart phone, a tablet computer, a notebook computer, a touch screen, a gaming machine, a personal computer (PC), a personal digital assistant (PDA), or the like. The terminal may further include a client, and the client may be a game application client, a browser client carrying a game program, or an instant messaging client, etc. The server may be an independent physical server, or may be a server cluster or a distributed system composed of more than one physical server, or may be a cloud server that provides cloud service, cloud database, cloud computing, cloud function, cloud storage, network service, cloud communication, middleware service, domain name service, security service, CDN, and basic cloud computing services such as big data and artificial intelligence platform.

Figure 1:
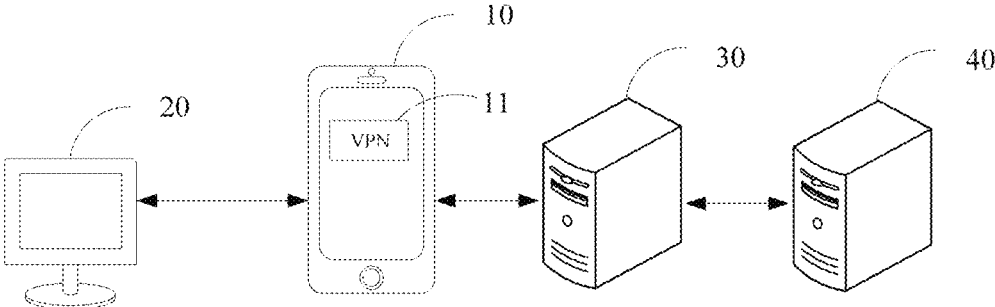
FIG. 1 is a schematic structural diagram of a system for game data acceleration according to an embodiment of the present disclosure.
Figure 2:
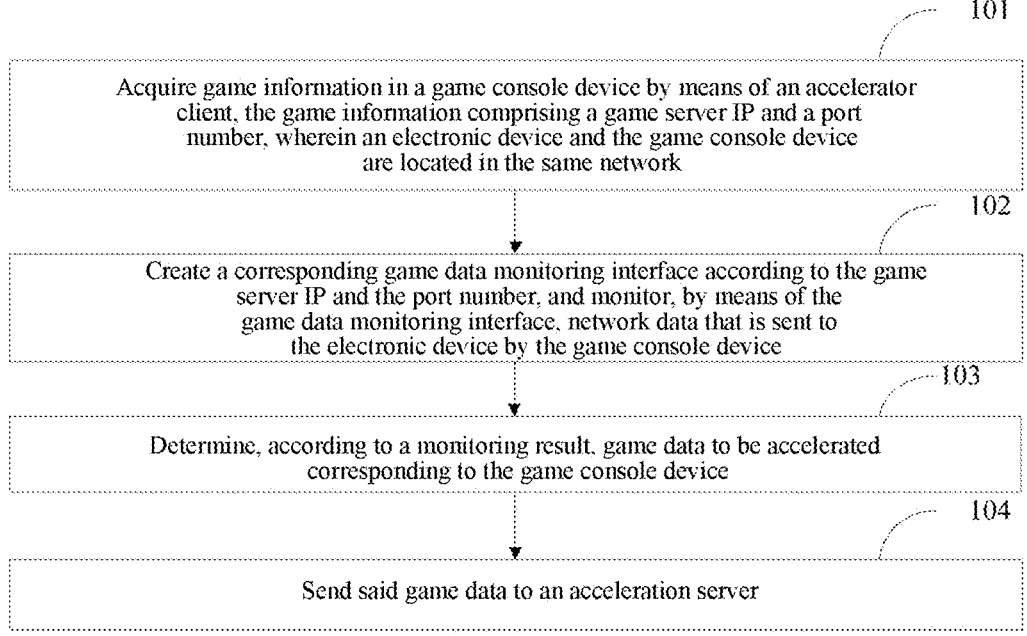
FIG. 2 is a schematic flowchart of a method for game data acceleration according to an embodiment of the present disclosure.

Referring to FIG. 1, FIG. 1 is a schematic structural diagram of a system for game data acceleration according to an embodiment of the present disclosure. Embodiments of the present disclosure provide a system for game data acceleration, including a mobile phone 10, a game host device 20, an acceleration server 30, and a game server 40. The mobile phone 10 is configured to obtain game information in the game host device 20, and the game information includes an IP and a port number of the game server, where the electronic device and the game host device are in the same network; the mobile phone 10 is configured to actuate an accelerator client 11 (such as a VPN service component) in the mobile phone to form a game data monitoring interface, and monitor network data sent to the mobile phone by the game host device by the game data monitoring interface. The mobile phone 10 determines game data to be accelerated corresponding to the game host device 20 according to the monitoring result; the mobile phone 10 sends the game data to be accelerated to the acceleration server 30 by the game data monitoring interface, and the acceleration server 30 transmits the accelerated game data to the game server 40 after accelerating the game data to be accelerated; and the game host device 20 is configured to upload network data (original traffic) to the mobile phone 10, and receive acceleration traffic returned by the game server 40 in response to the accelerated game data by the mobile phone 10. Specifically, a game data monitoring interface is forged by the accelerator client 11 in the mobile phone 10, and the game data monitoring interface may be used as an analog game server of the game host device 20 to intercept the network data uploaded by the game host device 20 into the accelerator client 11 in the mobile phone 10, then send the game data to be accelerated to the acceleration server 30 by the game data monitoring interface in the mobile phone 10, transmit it to the game server 40 after acceleration, and finally return the acceleration traffic (real data) returned by the game server 40 to the game host device 20, thus achieving the purpose of traffic hijacking forwarding. According to the embodiments of the present disclosure, the game data of the game host device 20 can be accelerated and forwarded by using the accelerator client 11 (such as a VPN service component) in the mobile phone 10, thus improving the network performance of the game and improving the convenience and flexibility of game data acceleration.

Referring to FIG. 2 to FIG. 10, embodiments of the present disclosure provides a method for game data acceleration, which is applied to an electronic device, and the electronic device is configured with an accelerator client, for example, the accelerator client may be a virtual private network (VPN) service component. In some embodiments, the electronic device may be a mobile phone or a tablet computer. The specific process of the method may be as follows:

In Step 101, game information in a game host device is obtained by the accelerator client, the game information includes an IP and a port number of the game server, where the electronic device and the game host device are in the same network.

In some embodiments, obtaining the game information in the game host device by the accelerator client, includes: obtaining game information corresponding to different game types in the game host device by the accelerator client, where the game information includes the IP and the port numbers of the game server corresponding to different game types.

In some embodiments, obtaining the game information corresponding to the different game types in the game host device by the accelerator client includes:

in response to determining that the game type is an online game in a P2P mode, obtaining an IP and a port number of a hole punching server of the online game in the P2P mode by the accelerator client; or in response to determining that the game type is a UDP game in a CS mode, obtaining an IP and a port number of a game center server of the UDP game in the CS mode by the accelerator client; or in response to determining that the game type is a TCP game in a CS mode, obtaining an IP and a port number of a game center server of the TCP game in the CS mode by the accelerator client.

Figure 3:
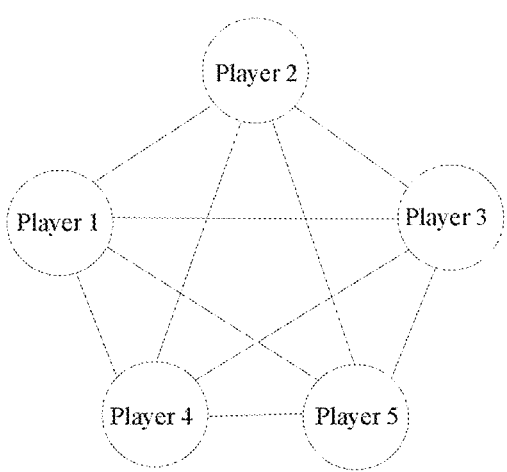
FIG. 3 is a schematic diagram of a connection mode of a game type according to an embodiment of the present disclosure.

For example, taking the electronic device being a mobile phone as an example, the game information of a currently running game application in the game host device is collected after the mobile phone establishes a communication connection with the game host device. Among them, the game application may be classified, and the game type mainly includes the following three types:

(1) Online Game in P2P Mode. Among them, P2P is a network mode in which UDP connection is performed point to point by a player, which is a common game mode of a player internet remote online game of a game host device. For example, FIG. 3 shows an online game in the P2P mode, and there is a point-to-point connection between a player and another player.

(2) UDP game in CS Mode. CS (Client/Server) mode refers to a client/server mode. UDP (User Data Protocol) is an unconnected unreliable transport layer protocol, and is commonly found in online games more sensitive to delay.

Figure 4:
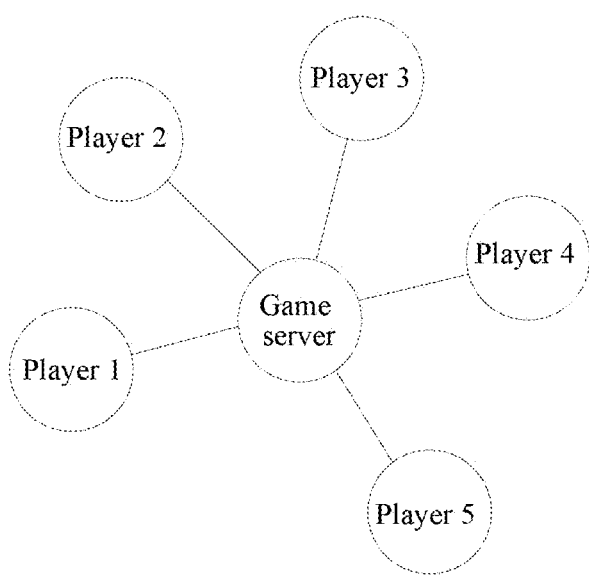
FIG. 4 is a schematic diagram of a connection mode of a game type according to an embodiment of the present disclosure.

(3) TCP game in CS Mode. TCP (Transmission Control Protocol) is a connection-oriented, reliable, byte stream-based transport layer communication protocol, and commonly found in an online game insensitive to delay. For example, FIG. 4 shows a UDP game/TCP game in a CS mode, the player establishes a connection with another player by a game center server.

For example, for the online game in the P2P mode, the mobile phone needs to collect the IP and the port number of the hole punching server of the game. For the UDP game of the CS mode, the mobile phone needs to collect the IP and the port number of the game center server of the game. For the TCP game in the CS mode, the mobile phone needs to collect the IP and the port number of the game center server of the game.

In step 102, a corresponding game data monitoring interface is established according to the IP and the port number of the game server, and network data sent to the electronic device by the game host device is monitored by the game data monitoring interface.

For example, an accelerator client such as a VPN service component can be started, a corresponding game data monitoring interface is established according to the IP and the port number of the game server, and the IP and the port number of the game server are monitored by the game data monitoring interface to obtain network data sent to the electronic device by the game host device.

Among them, the Virtual Private Network (VPN) establishes a temporary and secure connection by the Internet, and the connection can pass through an unreliable public network to establish a safe and stable tunnel. A VPN service is an extension to the construction of a company's internal network, by which it can help internal users located at the external network to establish a secure and trusted network connection and ensure the security of the transmission data. According to the embodiments of the present disclosure, the VPN service can be started by an application program (such as a UU host acceleration server) on the mobile phone, and the traffic entering the mobile phone can be intercepted and forwarded.

In some embodiments, establishing the corresponding game data monitoring interface according to the IP and the port number of the game server, and monitoring the network data sent to the electronic device by the game host device by the game data monitoring interface, includes:

establishing the game data monitoring interface corresponding to the different game types according to the IP and the port number of the game server corresponding to the different game types;

intercepting the network data sent by the game host device to the electronic device into the game data monitoring interface;

analyzing that whether the intercepted network data includes a network request to be accelerated by the game data monitoring interface.

In some embodiments, analyzing that whether the intercepted network data includes a network request to be accelerated includes:

obtaining all network request domain names to be accessed during a running process of a game in the game host device, by performing packet capture analysis on the intercepted network data by the game data monitoring interface;

in response to determining that there is a domain name with an access response speed lower than a preset response speed in the all network request domain names to be accessed, determining a network request corresponding to the domain name with the access response speed lower than the preset response speed in the all network request domain names to be accessed as the network request to be accelerated.

In some embodiments, after analyzing that whether the intercepted network data includes a network request to be accelerated, the method further includes:

in response to determining that the intercepted network data includes the network request to be accelerated, establishing a game data monitoring interface corresponding to the network request to be accelerated by the accelerator client, and configuring a proxy IP and a proxy port number of the game data monitoring interface.

In some embodiments, establishing the game data monitoring interface corresponding to different game types according to the IP and the port number of the game server corresponding to different game types, including:

in response to determining that the game type is the online game in the P2P mode, establishing a first UDP game data monitoring interface corresponding to the online game in the P2P mode according to the hole punching server IP and the port number of the online game in the P2P mode; or in response to determining that the game type is the UDP game in the CS mode, establishing a second UDP game data monitoring interface corresponding to the UDP game in the CS mode according to the IP and the port number of the game center server of the UDP game of the CS mode; or in response to determining that the game type is the TCP game in the CS mode, establishing a TCP game data monitoring interface corresponding to the TCP game in the CS mode according to the IP and the port number of the game center server of the TCP game in the CS mode.

For example, in response to determining that the game type is the online game in the P2P mode, the first UDP game data monitoring interface corresponding to the online game in the P2P mode is established by the VPN service component, and the IP and the port number of the game host device are added to the first UDP game data monitoring interface for monitoring, and the first UDP game data monitoring interface is configured to monitor the IP and the port number of the hole punching server of the online game in the P2P mode.

For example, in response to determining that the game type is the UDP game in the CS mode, the second UDP game data monitoring interface corresponding to the UDP game in the CS mode is established by the VPN service component, and the second UDP game data monitoring interface is configured to monitor the IP and the port number of the game center server of the UDP game in the CS mode.

For example, in response to determining that the game type is the TCP game in the CS mode, the TCP game data monitoring interface corresponding to the TCP game in the CS mode is established by the VPN service component, and the TCP game data monitoring interface is configured to monitor the IP and the port number of the game center server of the TCP game in the CS mode.

For example, the mobile phone VPN is started, the game information collected in the step 101 is bound on the mobile phone VPN, the game data monitoring interface is game established according to the game type and monitoring is performed, specifically, the UDP traffic or TCP traffic of a certain IP port is monitored to simulate the game server. The traffic is first intercepted by the IP port of the port monitored in the VPN, so that the network data uploaded by the game host device is performed deception, and the network data originally to be sent to the game server is intercepted into the game data monitoring interface established in the VPN service component. In the case of not establishing the game data monitoring interface for monitoring, the network data may be directly sent to the IP and port of the real server of the game.

Among them, during a monitoring process, it is analyzed that whether the intercepted network data includes a network request to be accelerated or not, where the network request includes at least one of an HTTP request and an HTTPS request. For example, it is analyzed that whether the intercepted network data includes the HTTP request to be accelerated, and the HTTP request address to be accelerated of the game is collected when the HTTP request to be accelerated is included.

For example, by performing packet capture analysis on network data of a game to determine whether an HTTP request and/or HTTPS request to be accelerated is included, all HTTP and/or HTTPS domain names that may be accessed during a game running process are obtained by packet capture. In response to determining that the domain name of the HTTP and/or HTTPS accessed by the game is slow, or the access is rejected, it is determined that the network request needs to be accelerated, and then the network request is added to the list to be accelerated as the network request to be accelerated. For example, in response to determining that the IP returned in response to the DNS request of the domain name is a foreign IP and the response speed of the foreign IP is slow, the foreign IP is added to the list to be accelerated. In response to determining that the IP returned in response to the domain name DNS request is the domestic IP and the response speed of the domestic IP is fast, there is no need to add the domestic IP to the list to be accelerated.

Figure 5:
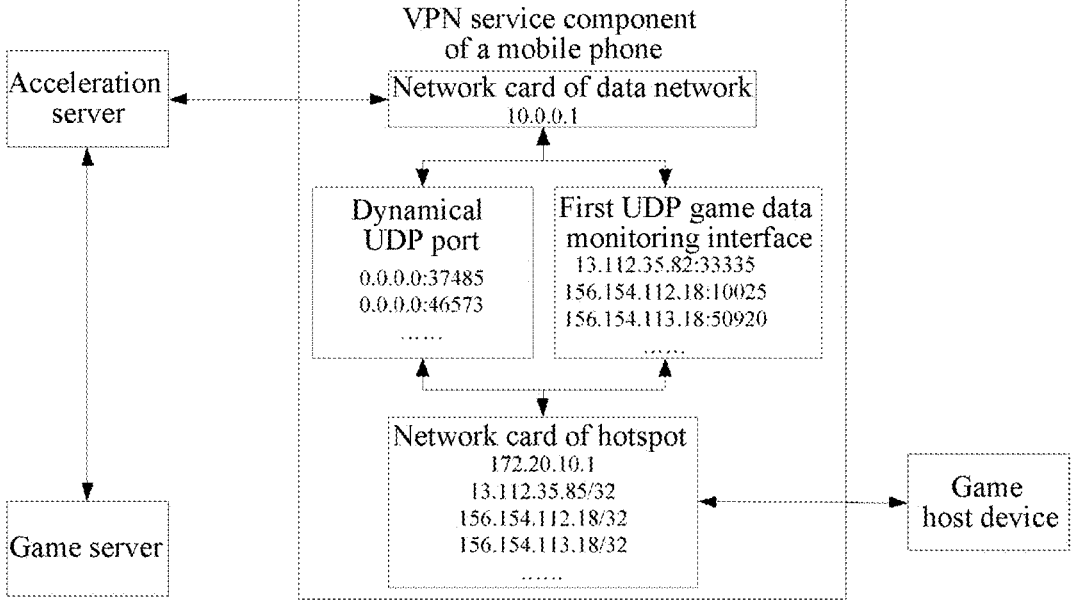
FIG. 5 is a schematic diagram of a first application scenario of a method for game data acceleration according to an embodiment of the present disclosure.

For example, as a proxy flowchart of an online game of the P2P mode shown in FIG. 5, in response to determining that the game type is an online game in a P2P mode, a first UDP game data monitoring interface is established in the VPN service component for monitoring an IP and a port of hole punching server of the online game in the P2P mode, and the IP of the remote player is dynamically added to the proxy routing table and the monitoring of the port for adding a player (such as 0.0. 0.0/Player port).

Figure 6:
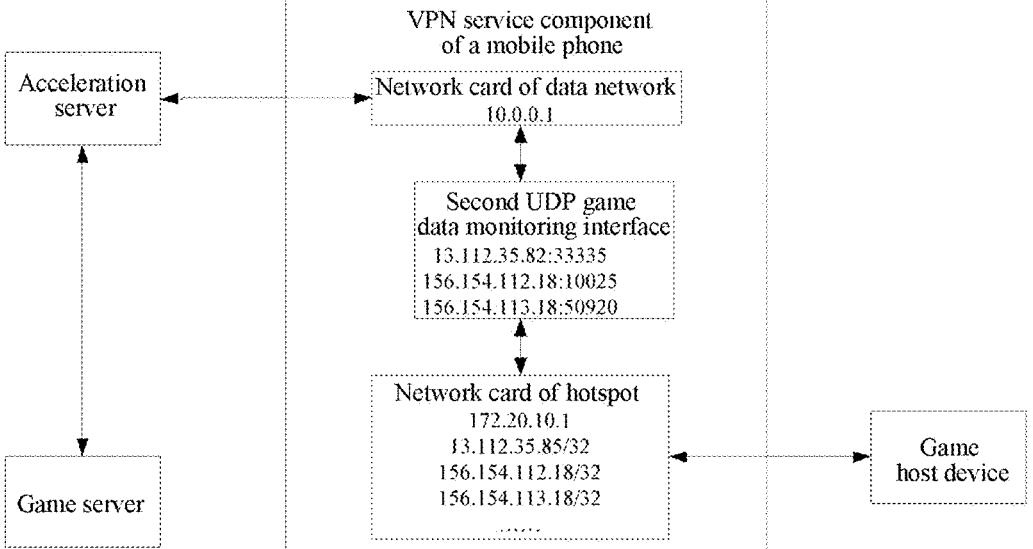
FIG. 6 is a schematic diagram of a second application scenario of a method for game data acceleration according to an embodiment of the present disclosure.

For example, as the proxy flowchart of the UDP game of the CS mode shown in FIG. 6, in response to determining that the game type is the UDP game in the CS mode, a second UDP game data monitoring interface for monitoring the IP and the port of the game center server of the UDP game of the CS mode is established in the VPN service component.

Figure 7:
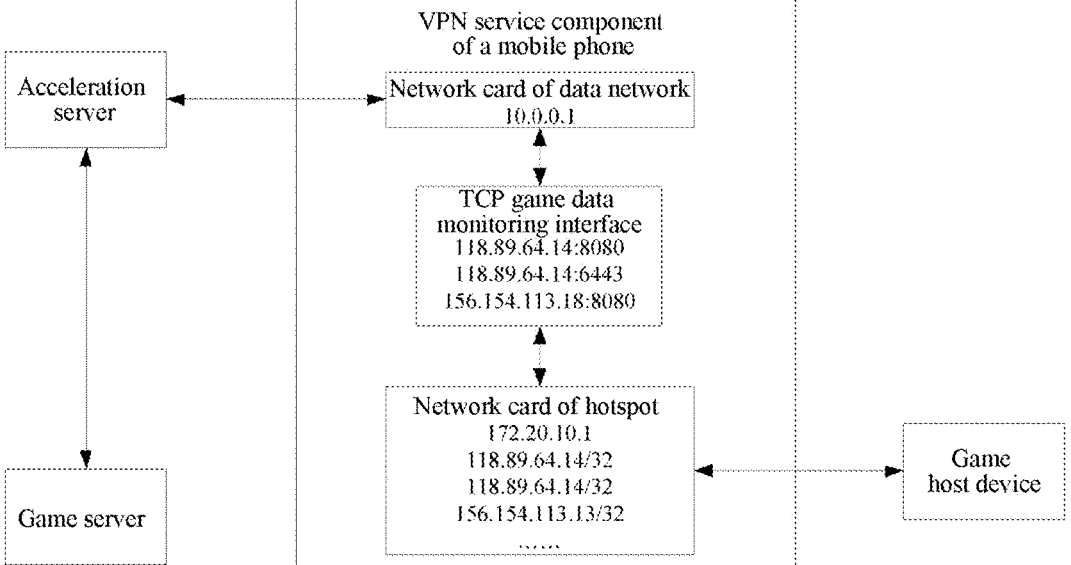
FIG. 7 is a schematic diagram of a third application scenario of a method for game data acceleration according to an embodiment of the present disclosure.

For example, as the proxy flowchart of the TCP game for the CS mode shown in FIG. 7, in response to determining that the game type is the TCP game in the CS mode, a TCP game data monitoring interface is established in the VPN service component, for monitoring the IP and port of game center server of the TCP game in the CS mode.

Figure 8:
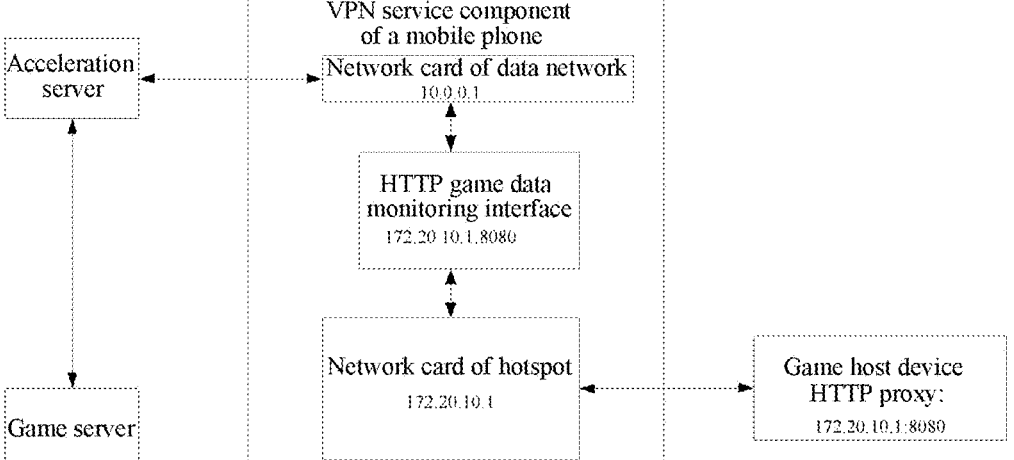
FIG. 8 is a schematic diagram of a fourth application scenario of a method for game data acceleration according to an embodiment of the present disclosure.
Figure 9:
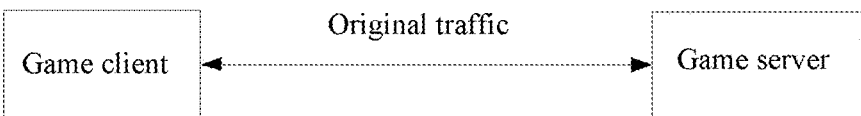
FIG. 9 is a schematic flowchart of traffic direction before acceleration in the related art.
Figure 10:
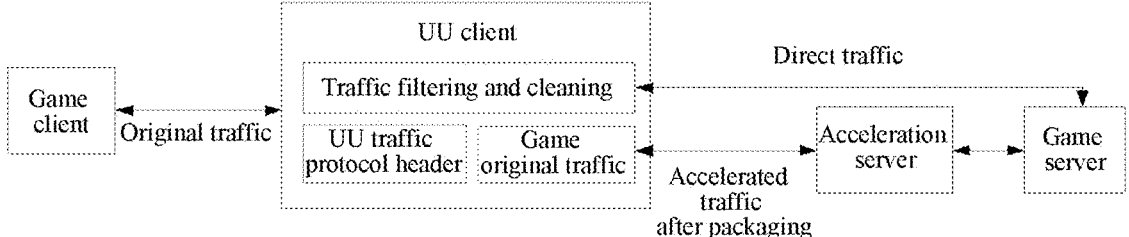
FIG. 10 is a schematic flowchart of an accelerated traffic direction according to an embodiment of the present disclosure.

For example, as the proxy flowchart of HTTP shown in FIG. 8, in response to determining that the intercepted network data includes a network request to be accelerated, such as an HTTP domain name request, a network game data monitoring interface of a local area network corresponding to the network request to be accelerated is established by the VPN service component, and an IP and a port number of the proxy connection are provided. The network game data monitoring interface is an HTTP game data monitoring interface.

For example, for different game scenes, a combination scheme of the above four game data monitoring interfaces may be used to accelerate according to actual requirements. For example, for the official website game of Nintendo Switch host device, a combination scheme of the first UDP game data monitoring interface and the HTTP game data monitoring interface may be adopted to accelerate the P2P online game and accelerate some domain name requests.

In step 103, game data to be accelerated corresponding to the game host device is determined according to the monitoring result.

In some embodiments, determining the game data to be accelerated in the game host device according to the monitoring result includes:

in response to determining that the interception result is that the intercepted network data includes the network request to be accelerated, determining the network data including the network request to be accelerated as the game data to be accelerated in the game host device.

For example, when the intercepted network data includes the network request to be accelerated, the network request to be accelerated is added to the list to be accelerated, and the traffic corresponding to the list to be accelerated is the game data to be accelerated in the game host device.

In step 104, the game data to be accelerated is sent to the acceleration server.

In some embodiments, sending the game data to be accelerated to the acceleration server includes:

marking, based on a preset protocol and preset header information, the game data to be accelerated by inserting the preset header information into a message header of the game data to be accelerated;

instructing the acceleration server to accelerate the game data to be accelerated by sending the marked game data to be accelerated to the acceleration server, and then transmitting the accelerated game data to the game server.

For example, the intercepted traffic is inserted into a customized preset header information in the header of the original game traffic message header by using a protocol similar to a preset protocol, and is performed packet splitting processing and forwarding via the game data monitoring interface.

For example, the traffic forwarding tag and the packet are standardized VPN forwarding protocols, for example, traffic forwarding may be performed by using a preset protocol such as OpenVPN and socks5. OpenVPN is implemented by an application layer VPN based on an OpenSSL library, and the OpenVPN allows a single point participating in the establishment of a VPN to use a shared key, an electronic certificate, or a user name/password for identity verification. Socks5 is a proxy protocol, which plays an intermediary role between the front-end machine using TCP/IP protocol communication and the server machine, so that the front-end machine in the internal network becomes able to access the server in the Internet network, or the communication is safer. The traffic forwarding of the VPN may employ any generic traffic forwarding protocol, or may use a modified VPN protocol. For example, when traffic analysis is performed, information such as a destination IP port is disassembled from the original IP traffic packet, whether accelerated forwarding of traffic needs to be performed is determined by matching and filtering with the acceleration configuration, the accelerated traffic requires inserting preset header information into the message header of the network data, and the preset header information is customized message header data, such as token information related to authentication. After sending the marked game data to be accelerated to the acceleration server to instruct the acceleration server to accelerate the game data to be accelerated, the accelerated game data is transmitted to the game server. The traffic forwarded to the game server by the acceleration server must include legal and correct customized message header data.

For example, when the mobile phone starts the VPN service component, a related UDP/TCP HTTP game data monitoring interface is established, and after the network of the mobile phone and the game host device are configured, the VPN service component of the mobile phone starts to process the traffic forwarding of the game host device, forwards the intercepted network data (original traffic) to the real game server by the preset acceleration server, and forwards the traffic of the real game server back to the game host device by the UDP/TCP HTTP game data monitoring interface, thus completing the whole acceleration process.

Among them, the acceleration server may be an acceleration application installed in the electronic device, or may be a cloud acceleration application with a connection entry located in the electronic device. The acceleration server may be a UU acceleration server or other cloud servers. For example, the UU acceleration server forwards the traffic of the game host device by a layer, so that the traffic may reach the game server through the game data monitoring interface of high speed, and then may be transmitted to the game host device by the game data monitoring interface. As the schematic flowchart of traffic direction before acceleration shown in FIG. 9, the original traffic (network data) generated by the game client is directly sent to the game server. As the schematic flowchart of an accelerated traffic direction shown in FIG. 10, the original traffic (network data) generated by the game client is performed filtering and cleaning process via a network accelerator client (such as a UU client), and then packaged into accelerated traffic. Then the accelerated traffic is forwarded to the game server by the acceleration server. In addition, direct traffic may be transmitted between the UU client and the game server. Among them, when the traffic filtering and cleaning process is performed, a UU traffic protocol header is inserted into the message header of the game original traffic to perform acceleration marking on the original traffic. The traffic filtering and cleaning processing further includes routing configuration, domain name regular configuration, domain name blacklist configuration, domain name white list configuration, IP configuration of P2P, and the like.

With no game data listening interface, the original traffic is directly sent to the game server, although traffic is intercepted but there is no acceleration effect. In the embodiments of the present disclosure, the game data monitoring interface is set by the VPN for monitoring, that is, game traffic interception is performed by the game data monitoring interface, and the intercepted traffic is performed analyzing, marking, packaging, and other traffic filtering and cleaning processing, so that the game data to be accelerated includes legal and correct customized message header data, and the marked game data is forwarded by the UU acceleration server, so that the traffic is transmitted faster.

All of the above technical solutions may be combined freely to form an optional embodiment of the present disclosure, and details are not described herein again.

According to the method for game data acceleration provided by the embodiments of the present disclosure, the game information in the game host device is obtained by the accelerator client configured in the electronic device, the game information includes the IP and the port number of the game server, and the electronic device and the game host device are located in the same network. A corresponding game data monitoring interface is established according to the IP and the port number of the game server, and the network data sent to the electronic device by the game host device is monitored by the game data monitoring interface; the game data to be accelerated corresponding to the game host device is determined according to the monitoring result; and the game data to be accelerated is sent to the acceleration server. According to the embodiment of the present disclosure, the game data of the game host device can be accelerated and forwarded by using the accelerator client of the electronic device, so that the network performance of the game is improved, and the convenience and flexibility of game data acceleration are improved.

Referring to FIG. 11 to FIG. 15, embodiments of the present disclosure provide a method for game data acceleration, which is applied to an electronic device, and the electronic device is configured with an accelerator client, for example, the accelerator client may be a virtual private network (VPN) service component. In some embodiments, the electronic device may be a mobile phone or a tablet computer. The specific process of the method may be as follows:

In step 201, a network connection is established with a game host device in a wireless mode or a wired mode, so that the electronic device and the game host device are in the same network.

In some embodiments, the wireless mode includes a connection mode that the electronic device and the game host device are connected to a same WiFi network.

In some embodiments, the wireless mode includes a connection mode in which the electronic device establishes a connection with the game host device by a shared hotspot.

In some embodiments, establishing the network connection with the game host device in the wireless mode or the wired mode, so that the electronic device and the game host device are in the same network, further includes: sending a request for modifying the IP to the game host device, where the request for modifying the IP carries a local area network IP of the electronic device, and the request for modifying the IP is used to instruct the game host device to modify the gateway IP in the game host device to the local area network IP of the electronic device, so that the electronic device and the game host device are in the same network.

Figure 12:
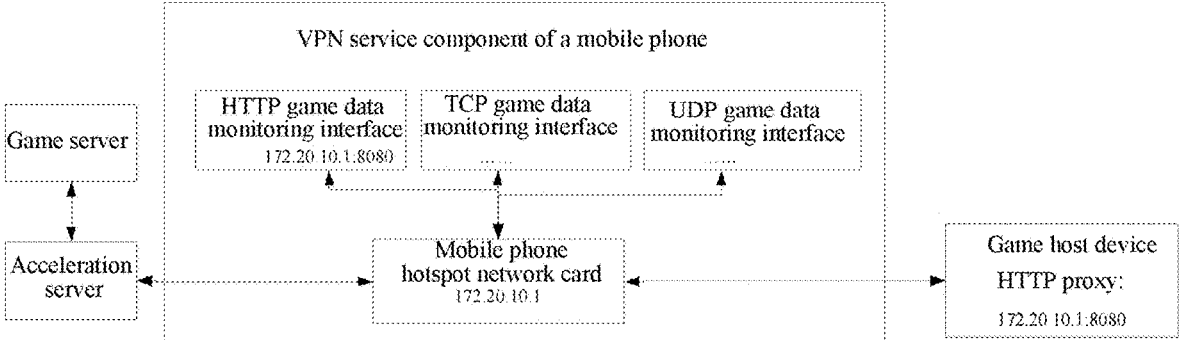
FIG. 12 is a schematic diagram of a fifth application scenario of a method for game data acceleration according to an embodiment of the present disclosure.
Figure 13:
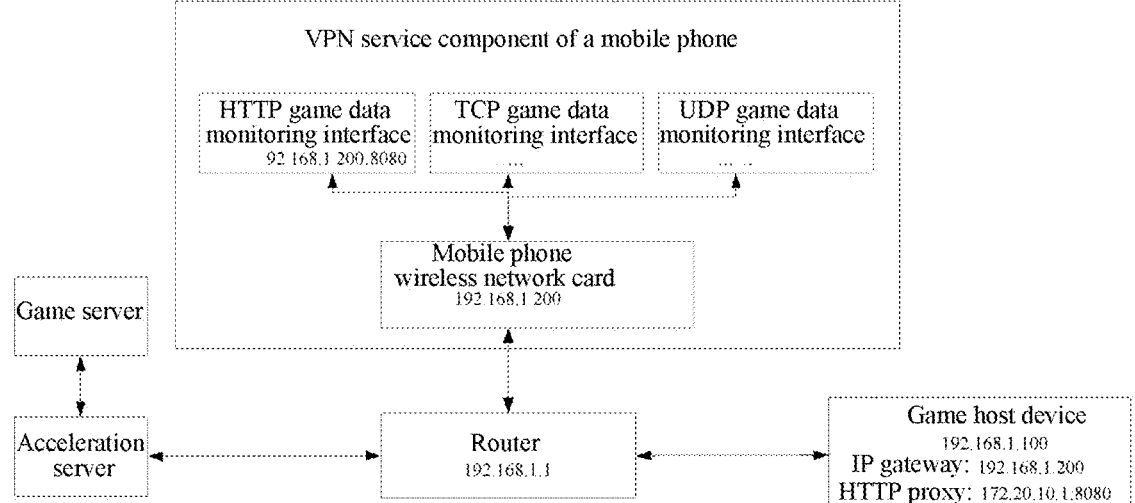
FIG. 13 is a schematic diagram of a sixth application scenario of a method for game data acceleration according to an embodiment of the present disclosure.

For example, before the game information is obtained, it is necessary to set the mobile phone and the game host device to be under the same network. Taking the wireless mode as an example, as shown in FIG. 12, the mobile phone and the game host device are connected to the same WiFi network, and the game host device is connected into a VPN service component of the mobile phone by a router of the WiFi network (such as 192.168. 1.1). As shown in FIG. 13, the mobile phone shares a hotspot or WLAN sharing network to the game host device for connection, and the game host device is connected into the VPN service component of the mobile phone by a mobile phone hotspot network card (such as 172.20. 10.1).

Among them, when a network connection is established between the mobile phone and the game host device, it is also necessary to send a request for modifying the IP to the game host device, the request for modifying the IP carries the local area network IP of the electronic device, and the request for modifying the IP is used to instruct the game host device to modify the gateway IP in the game host device to the local area network IP of the electronic device. For example, the gateway IP of the game host device is set as the local area network IP of the mobile phone, which is equivalent to simulating the mobile phone as the router of the game host device.

In addition, for the game requiring to accelerate the HTTP domain name, it is required to configure the IP of the HTTP game data monitoring interface on the game host device. A request for modifying the IP is sent to the game host device, where the request for modifying the IP carries a local area network IP of the electronic device, and the request for modifying the IP is used to instruct the game host device to modify the gateway IP in the game host device to the local area network IP of the electronic device, where the local area network IP includes the proxy IP of the HTTP game data monitoring interface.

Figure 14:
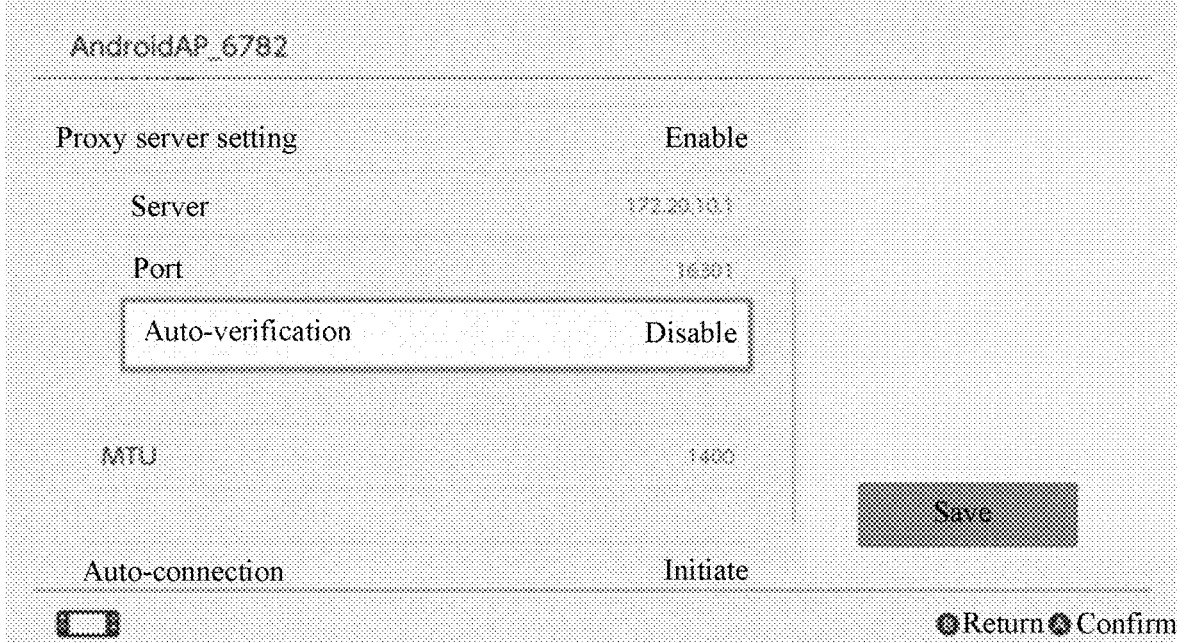
FIG. 14 is a schematic diagram of a seventh application scenario of a method for game data acceleration according to an embodiment of the present disclosure.

For example, the connection process of the game host device is shown by FIG. 14 and FIG. 15, which is described below taking a Switch host device being connected to a mobile phone as an example.

FIG. 14 shows a hotspot connection mode. After the mobile phone is used to accelerate successfully, the Switch host is connected to the hotspot of the mobile phone, and then the HTTP proxy is modified, for example, the IP of the game data monitoring interface in the Switch host is configured as 172.20. 10.1, that is, the IP of the proxy server in FIG. 14 is configured as 172.20. 10.1, which is the same as the IP of the mobile phone hotspot network card.

FIG. 15 shows a connection mode of the same WiFi. After the mobile phone is used to accelerate successfully, the Switch host and the mobile phone are connected to the same WiFi, and the configuration process is as follows:

After connecting to WiFi, the Switch enters a configuration interface to record an IP address (e.g., 192.168. 88.73) under the "Internet" option, a subnet mask (e.g., 255.255. 255.0) and DNS address (e.g., 192.168. 88.1). After the recording is completed, on the Internet configuration interface, WiFi for acceleration is selected and the configuration is modified. The recorded IP address, subnet mask and DNS address are filled into the corresponding Wi-Fi configuration, and meanwhile, the IP address in pop-up window configured for acceleration success is filled into the gateway, the IP address of the game data monitoring interface is filled into the server (172.20.10.1), and the connection is re-established after the configuration is saved.

In step 202, game information in the game host device is obtained by the accelerator client, where the game information includes an IP and a port number of the game server, the electronic device and the game host device are in the same network. For the specific implementation of step 202, it can be referred to the embodiments of step 101, and details are not described here again.

In step 203, a corresponding game data monitoring interface is established according to the IP and the port number of the game server, and network data sent to the electronic device by the game host device is monitored by the game data monitoring interface. For the specific implementation of step 203, it can be referred to the embodiments of step 102, and details are not described here again.

In step 204, game data to be accelerated corresponding to the game host device is determined according to the monitoring result. For the specific implementation of step 204, it can be referred to the embodiments of step 103, and details are not described here again.

In step 205, the game data to be accelerated is sent to the acceleration server. For the specific implementation of step 205, it can be referred to the embodiments of step 104, and details are not described here again.

All of the above technical solutions may be combined freely to form an optional embodiment of the present disclosure, and details are not described here again.

According to the method for game data acceleration provided by the embodiments of the present disclosure, a network connection is established with the game host device in a wireless mode or a wired mode, so that the electronic device and the game host device are in the same network. Then, game information in the game host device is obtained by an accelerator client configured in the electronic device, where the game information includes an IP and a port number of the game server. A corresponding game data monitoring interface is established according to the IP and the port number of the game server, and network data sent to the electronic device by the game host device is monitored by the game data monitoring interface. Game data to be accelerated corresponding to the game host device is determined according to the monitoring result, and the game data to be accelerated is sent to the acceleration server. According to the embodiments of the present disclosure, the game data of the game host device can be accelerated and forwarded by using the accelerator client of the electronic device, so that the network performance of the game is improved, and the convenience and flexibility of game data acceleration are improved.

Figure 16:
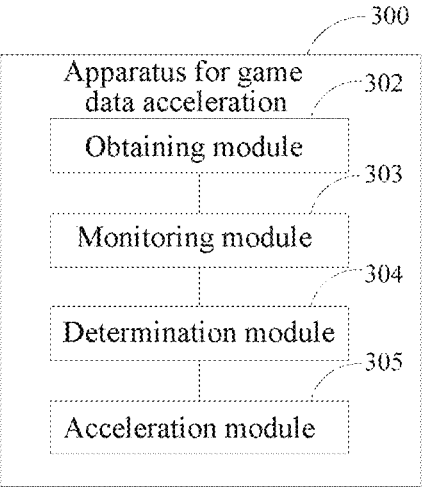
FIG. 16 is a schematic structural diagram of an apparatus for game data acceleration according to an embodiment of the present disclosure.
Figure 17:
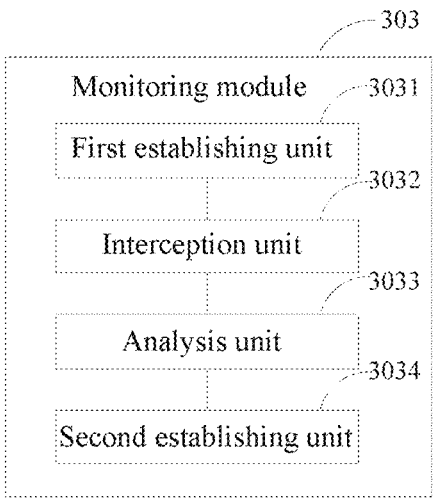
FIG. 17 is a schematic structural diagram of a monitoring module according to an embodiment of the present disclosure.

In order to facilitate better implementation of the method for game data acceleration of the embodiments of the present disclosure, the embodiments of the present disclosure further provide an apparatus for game data acceleration, the apparatus for game data acceleration is applied to an electronic device, and the electronic device is configured with an accelerator client, for example, the accelerator client may be a virtual private network (VPN) service component. Referring to FIG. 16 to FIG. 17, the apparatus 300 for game data acceleration may include an obtaining module 302, a monitoring module 303, a determination module 304, and an acceleration module 305.

Among them, the obtaining module 302 is configured to perform obtaining game information in a game host device by the accelerator client, the game information includes an IP and a port number of a game server, and the electronic device and the game host device are in a same network.

The monitoring module 303 is configured to perform establishing a corresponding game data monitoring interface according to the IP and the port number of the game server and monitoring network data sent to the electronic device by the game host device by the game data monitoring interface.

The determining module 304 is configured to perform determining game data to be accelerated corresponding to the game host device according to a monitoring result.

The acceleration module 305 is configured to perform acceleration on the game data to be accelerated by the game data monitoring interface and then transmit to the game server.

In some embodiments, the obtaining module 302 is configured to perform obtaining the game information corresponding to different game types in the game host device by the accelerator client, where the game information comprises the IP and the port number of the game server corresponding to the different game types.

In some embodiments, as shown in FIG. 17, the monitoring module 303 includes:

a first establishing unit 3031, configured to perform establishing the game data monitoring interface corresponding to the different game types according to the IP and the port number of the game server corresponding to the different game types;

an interception unit 3032, configured to perform intercepting the network data sent by the game host device to the electronic device into the game data monitoring interface;

an analysis unit 3033, configured to perform analyzing whether the intercepted network data includes a network request to be accelerated by the game data monitoring interface.

In some embodiments, the analysis unit 3033 is configured to perform obtaining all network request domain names to be accessed during a running process of a game in the game host device by performing packet capture analysis on the intercepted network data by the game data monitoring interface. In response to determining that there is a domain name with an access response speed lower than a preset response speed in the all network request domain names to be accessed, a network request corresponding to the domain name with the access response speed lower than the preset response speed in the all network request domain names to be accessed is determined as the network request to be accelerated.

In some embodiments, the monitoring module 303 further includes:

a second establishing unit 3034, configured to perform establishing a game data monitoring interface corresponding to the network request to be accelerated by the accelerator client and configuring a proxy IP and a proxy port number of the game data monitoring interface, in response to determining that the intercepted network data includes the network request to be accelerated.

In some embodiments, the determining module 304 is configured to perform determining the network data including the network request to be accelerated as the game data to be accelerated corresponding to the game host device, in response to determining that the monitoring result is that the intercepted network data includes the network request to be accelerated.

In some embodiments, the acceleration module 305 is configured to perform: based on a preset protocol and preset header information, inserting preset header information into a message header of the game data to be accelerated, so as to mark the game data to be accelerated; and sending the marked game data to be accelerated to an acceleration server, so as to instruct the acceleration server to accelerate the game data to be accelerated, and then transmit the accelerated game data to the game server.

In some embodiments, the obtaining module 302 is configured to perform:

in response to determining that the game type is an online game in a P2P mode, obtaining an IP and a port number of a hole punching server of the online game in the P2P mode by the accelerator client; or in response to determining that the game type is a UDP game in a CS mode, obtaining an IP and a port number of a game center server of the UDP game in the CS mode by the accelerator client; or in response to determining that the game type is a TCP game in a CS mode, obtaining an IP and a port number of a game center server of the TCP game in the CS mode by the accelerator client.

In some embodiments, the first establishing unit 3031 is configured to perform:

in response to determining that the game type is the online game in the P2P mode, establishing a first UDP game data monitoring interface corresponding to the online game in the P2P mode according to the hole punching server IP and the port number of the online game in the P2P mode; or in response to determining that the game type is the UDP game in the CS mode, establishing a second UDP game data monitoring interface corresponding to the UDP game in the CS mode according to the IP and the port number of the game center server of the UDP game of the CS mode; or in response to determining that the game type is the TCP game in the CS mode, establishing a TCP game data monitoring interface corresponding to the TCP game in the CS mode according to the IP and the port number of the game center server of the TCP game in the CS mode.

In some embodiments, the electronic device is a mobile phone.

Figure 18:
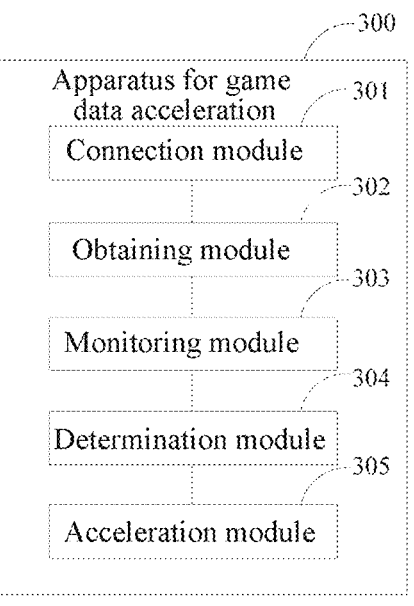
FIG. 18 is another schematic structural diagram of an apparatus for game data acceleration according to an embodiment of the present disclosure.

Referring to FIG. 18, FIG. 18 differs from FIG. 16 in that the apparatus 300 for game data acceleration further includes a connection module 301.

Among them, the connection module 301 is configured to perform establishing a network connection with the game host device by the electronic device in a wireless mode or a wired mode, so that the electronic device and the game host device are in the same network.

In some embodiments, the wireless mode includes a connection mode that the electronic device and the game host device are connected to a same WiFi network.

In some embodiments, the wireless mode includes a connection mode in which the electronic device establishes a connection with the game host device by a shared hotspot.

In some embodiments, the connection module 301 is further configured to perform sending a request for modifying the IP to the game host device, the request for modifying the IP carries a local area network IP of the electronic device, and the request for modifying the IP is used to instruct the game host device to modify a gateway IP in the game host device to the local area network IP of the electronic device, so that the electronic device and the game host device are in the same network.

All of the above technical solutions may be combined freely to form an optional embodiment of the present disclosure, and details are not described here again.

According to the apparatus 300 for game data acceleration provided in the embodiments of the present disclosure, the game information in the game host device is obtained by the obtaining module 302, and the game information includes the game server IP and the port number of the game server; the monitoring module 303 is configured to perform the startup of the VPN service component to form a game data monitoring interface, and the game data monitoring interface is configured to perform monitoring of the IP and the port number of the game server; the determination module 304 is configured to perform determining the game data to be accelerated in the game host device according to the monitoring result of the game data monitoring interface; and the acceleration module 305 is configured to perform the acceleration of the game data to be accelerated by the game data monitoring interface, and then transmit to the game server. According to the embodiments of the present disclosure, the game data of the game host device can be accelerated and forwarded by using the VPN service component in the electronic device, so that the network performance of the game is improved, and the convenience and flexibility of game data acceleration are improved.

Figure 19:
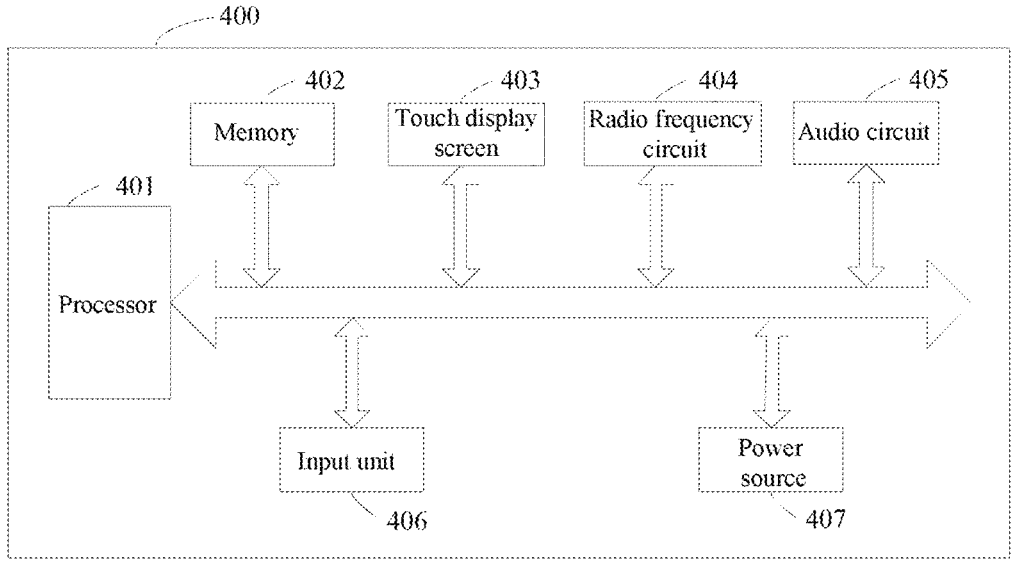
FIG. 19 is a schematic structural diagram of an electronic device according to an embodiment of the present disclosure.

Correspondingly, the embodiments of the present disclosure further provide an electronic device, the electronic device may be a terminal, and the terminal may be a terminal device such as a smart phone, a tablet computer, a notebook computer, a touch screen, a game machine, a personal computer (PC), a personal digital assistant (PDA), and the like. As shown in FIG. 19, FIG. 19 is a schematic structural diagram of an electronic device according to an embodiment of the present disclosure. The electronic device 400 includes a processor 401 having one or more processing cores, a memory 402 having one or more computer-readable storage medium, and a computer program stored on the memory 402 and executable on the processor. Among them, the processor 401 is electrically connected to the memory 402. It will be appreciated by those skilled in the art that the electronic device structure shown in the figures does not constitute a limitation on the electronic device, and may include more or fewer components than those illustrated, or combination of some components, or different component arrangements.

The processor 401 is a control center of the electronic device 400, which connects various parts of the entire electronic device 400 by using various interfaces and lines, and performs various functions and processing data of the electronic device 400 by running or loading software programs and/or modules stored in the memory 402 and invoking data stored in the memory 402, thus performing overall monitoring on the electronic device 400.

In the embodiments of the present disclosure, the processor 401 in the electronic device 400 loads an instruction corresponding to a process of one or more application programs into the memory 402 according to the following steps, and the application program stored in the memory 402 is run by the processor 401, thus implementing various functions:

obtaining game information in a game host device by an accelerator client, where the game information includes an IP and a port number of a game server, and the electronic device and the game host device are in a same network; establishing a corresponding game data monitoring interface according to the IP and the port number of the game server, and monitoring network data sent to the electronic device by the game host device by the game data monitoring interface; determining game data to be accelerated corresponding to the game host device according to a monitoring result; and sending the game data to be accelerated to an acceleration server.

For specific implementation of the operations above, reference may be made to the foregoing embodiments, and details are not described here again.

In some embodiments, as shown in FIG. 19, the electronic device 400 further includes a touch display screen 403, a radio frequency circuit 404, an audio circuit 405, an input unit 406, and a power source 407. Among them, the processor 401 is electrically connected to the touch display screen 403, the radio frequency circuit 404, the audio circuit 405, the input unit 406, and the power source 407, respectively. It will be appreciated by those skilled in the art that the electronic device structure shown in FIG. 19 does not constitute a limitation on an electronic device, which may include more or fewer components than those illustrated, or combination of some components, or different component arrangements.

The touch display screen 403 may be configured to display a graphical user interface and receive an operation instruction generated by a user acting on the graphical user interface. The touch display screen 403 may include a display panel and a touch panel. The display panel may be configured to display information input by a user or information provided to a user and various graphical user interfaces of the electronic device, and the graphical user interfaces may be composed of graphics, text, icons, videos, and any combination of them. In some embodiments, the display panel may be configured in the form of a liquid crystal display (LCD), an organic light-emitting diode (OLED), etc. The touch panel may be configured to collect a touch operation of a user on or near the touch panel (for example, an operation of a user using any suitable object or accessory such as a finger or a stylus on the touch panel or near the touch panel), and generates a corresponding operation instruction, and the operation instruction performs a corresponding program. In some embodiments, the touch panel may include two part of a touch detection device and a touch controller. Among them, the touch detection device detects a touch orientation of a user, detects a signal caused by the touch operation, and transmits the signal to the touch controller; and the touch controller receives the touch information from the touch detection device, converts the touch information into contact coordinates, then sends the touch information to the processor 401, and can receive and execute commands sent by the processor 401. The touch panel may cover the display panel, after detecting a touch operation on or near it, the touch panel send it to the processor 401 to determine the type of the touch event, and then the processor 401 provides a corresponding visual output on the display panel according to the type of the touch event. In the embodiments of the present disclosure, the touch panel and the display panel may be integrated into the touch display screen 403 to implement input and output functions. However, in some embodiments, the touch panel and the touch panel may serve as two independent components to implement input and output functions. That is, the touch display screen 403 may also serve as part of the input unit 406 to implement input functions.

The radio frequency circuit 404 may be configured to receive and transmit a frequency signal to establish a wireless communication with a network device or another electronic device by wireless communication, so as to transmit signals to or receive signals from the radio a network device or another electronic device.

The audio circuit 405 may be used to provide an audio interface between a user and an electronic device by a speaker, microphone. The audio circuit 405 may convert the received audio data into an electrical signal, transmit the electrical signal to the speaker which convert the electrical signal into a sound signal and output it; on the other hand, the microphone converts the collected sound signal into an electrical signal, the electrical signal is converted into audio data after receiving by the audio circuit 405, the audio data is output to the processor 401 for processing and is sent to another electronic device by the radio frequency circuit 404, or the audio data is output to the memory 402 for further processing. The audio circuit 405 may further include an earplug jack to provide communication between a peripheral earphone and the electronic device.

The input unit 406 may be configured to receive input numbers, character information, or user characteristic information (such as fingerprints, irises, facial information, etc.), and generate signal input of a keyboard, a mouse, an operating lever, an optical or trackball related to user configuration and function control.

The power supply 407 is configured to supply power to various components of the electronic device 400. In some embodiments, the power source 407 may be logically connected to the processor 401 by the power management system, so as to achieve the functions of managing charging, discharging, power consumption management and the like by the power management system. The power supply 407 may further include one or more direct current or alternating current power supplies, a recharging system, a power failure detection circuit, a power converter or an inverter, a power state indicator, and any other components.

Although not shown in FIG. 19, the electronic device 400 may further include a camera, a sensor, a wireless fidelity module, a Bluetooth module, etc., which will not be repeated here.

In the above embodiments, the descriptions of the various embodiments are emphasized respectively, and the part in some embodiments that are not described in detail may be referred to the related description of other embodiments.

As can be seen from the above, the electronic device provided in embodiments obtains the game information in the game host device by the accelerator client configured in the electronic device, the game information includes the IP and the port number of the game server, where the electronic device and the game host device are in the same network. A corresponding game data monitoring interface is established according to the IP and the port number of the game server, and network data sent to the electronic device by the game host device is monitored by the game data monitoring interface; game data to be accelerated corresponding to the game host device is determined according to the monitoring result; and the game data to be accelerated is sent to the acceleration server. According to the embodiments of the present disclosure, the game data of the game host device can be accelerated and forwarded by using the electronic accelerator client, so that the network performance of the game is improved, and the convenience and flexibility of game data acceleration are improved.

Those of ordinary skill in the art may understand that all or some of the steps in the various methods of the foregoing embodiments may be completed by an instruction, or may be completed by the instruction controlling related hardware, and the instruction may be stored in a computer-readable storage medium and loaded and executed by a processor.

By this, the embodiments of the present disclosure provide a computer-readable storage medium, where a plurality of computer programs are stored, and the computer programs can be loaded by a processor to perform the steps in any method for game data acceleration provided in the embodiments of the present disclosure. For example, the computer program may perform the following steps:

obtaining game information in a game host device by the accelerator client, the game information comprising an IP and a port number of a game server, wherein the electronic device and the game host device are in a same network; establishing a corresponding game data monitoring interface according to the IP and the port number of the game server, and monitoring network data sent to the electronic device by the game host device by the game data monitoring interface; determining game data to be accelerated corresponding to the game host device according to a monitoring result; and sending the game data to be accelerated to an acceleration server.

For specific implementation of the operations above, reference may be made to the foregoing embodiments, and details are not described here again.

Among them, the storage medium may include a read-only memory (ROM), a random access memory (RAM), a magnetic disk, an optical disc, and the like.

Since the computer program stored in the storage medium may perform the steps in any method for game data acceleration provided in the embodiments of the present disclosure, the beneficial effects that can be achieved by any method for game data acceleration provided in the embodiments of the present disclosure can be achieved, seeing the foregoing embodiments, details are not described here again.

The method for game data acceleration, the storage medium, the electronic device, and the system provided by the embodiments of the present disclosure are described above in detail, and the principles and embodiments of the present disclosure are described here with specific examples, and the description of the above embodiments is merely used to help understand the method of the present disclosure and the core concept. Meanwhile, for those skilled in the art, according to the concept of the present disclosure, there will be changes in the specific implementation mode and application scope. In conclusion, the content of the present disclosure should not be construed as a limitation to the present disclosure.

What is claimed is:

1. A method for game data acceleration, applied to an electronic device, wherein the electronic device is configured with an accelerator client, the method comprises:

establishing a network connection with a game host device in a wireless mode or a wired mode by sending a request for modifying an IP to the game host device, wherein the request for modifying the IP comprises a local area network IP of the electronic device, and the request for modifying the IP is used to instruct the game host device to modify a gateway IP in the game host device to the local area network IP of the electronic device, wherein the gateway IP modification configures the game host device to route packets to the electronic device;

obtaining game information in the game host device by the accelerator client, the game information comprising an IP and a port number of a game server, wherein the electronic device and the game host device are in a same network;

establishing a game data monitoring interface according to the IP and the port number of the game server, and monitoring network data sent to the electronic device by the game host device by the game data monitoring interface;

determining game data to be accelerated corresponding to the game host device according to a monitoring result; and sending the game data to be accelerated to an acceleration server.

2. The method for game data acceleration according to claim 1, wherein the obtaining the game information in the game host device by the accelerator client comprises:

obtaining the game information corresponding to a game type in the game host device by the accelerator client, wherein the game information comprises the IP and the port number of the game server corresponding to the game type.

3. The method for game data acceleration according to claim 2, wherein the establishing the corresponding game data monitoring interface according to the IP and the port number of the game server, and monitoring the network data sent to the electronic device by the game host device by the game data monitoring interface comprises:

establishing the game data monitoring interface corresponding to the game type according to the IP and the port number of the game server corresponding to the game type;

intercepting the network data sent to the electronic device by the game host device into the game data monitoring interface; and determining that the intercepted network data comprises a network request to be accelerated by the game data monitoring interface.

4. The method for game data acceleration according to claim 3, wherein the determining that the intercepted network data comprises the network request to be accelerated by the game data monitoring interface comprises:

obtaining all network request domain names to be accessed during a running process of a game in the game host device, by performing packet capture analysis on the intercepted network data by the game data monitoring interface; and determining a network request corresponding to a domain name with an access response speed lower than a preset response speed in the all network request domain names to be accessed as the network request to be accelerated.

5. The method for game data acceleration according to claim 3, wherein the method further comprises:

establishing the game data monitoring interface corresponding to the network request to be accelerated by the accelerator client, and configuring a proxy IP and a proxy port number of the game data monitoring interface.

6. The method for game data acceleration according to claim 3, wherein the determining the game data to be accelerated corresponding to the game host device according to the monitoring result comprises:

determining the network data comprising the network request to be accelerated as the game data to be accelerated corresponding to the game host device.

7. The method for game data acceleration according to claim 6, wherein the sending the game data to be accelerated to the acceleration server comprises:

marking, based on a preset protocol and preset header information, the game data to be accelerated by inserting the preset header information into a message header of the game data to be accelerated; and instructing the acceleration server to accelerate the game data to be accelerated by sending the marked game data to be accelerated to the acceleration server, and transmitting the accelerated game data to the game server.

8. The method for game data acceleration according to claim 2, wherein the obtaining the game information corresponding to the game type in the game host device by the accelerator client comprises:

obtaining, in response to determining that the game type comprises an online game in a P2P mode, an IP and a port number of a hole punching server of the online game in the P2P mode by the accelerator client; or obtaining, in response to determining that the game type comprises a UDP game in a client/server (CS) mode, an IP and a port number of a game center server of the UDP game in the CS mode by the accelerator client; or obtaining, in response to determining that the game type comprises a TCP game in a CS mode, an IP and a port number of a game center server of the TCP game in the CS mode by the accelerator client.

9. The method for game data acceleration according to claim 8, wherein the establishing the game data monitoring interface corresponding to the game type according to the IP and the port number of the game server corresponding to the game type comprises:

establishing, in response to determining that the game type is the online game in the P2P mode, a first UDP game data monitoring interface corresponding to the online game in the P2P mode according to the hole punching server IP and the port number of the online game in the P2P mode; or establishing, in response to determining that the game type is the UDP game in the CS mode, a second UDP game data monitoring interface corresponding to the UDP game in the CS mode according to the IP and the port number of the game center server of the UDP game of the CS mode; or establishing, in response to determining that the game type is the TCP game in the CS mode, a TCP game data monitoring interface corresponding to the TCP game in the CS mode according to the IP and the port number of the game center server of the TCP game in the CS mode.

10. The method for game data acceleration according to claim 1, wherein the wireless mode comprises a connection mode of the electronic device and the game host device being connected to a same WiFi network.

11. The method for game data acceleration according to claim 1, wherein the wireless mode comprises a connection mode of the electronic device establishing a connection with the game host device by sharing a hotspot.

12. An electronic device, comprising a memory and a processor, wherein a computer program is stored in the memory, wherein the electronic device is configured with an accelerator client, and the processor invokes the computer program stored in the memory to cause the electronic device to:

establish a network connection with a game host device in a wireless mode or a wired mode by sending a request for modifying an IP to the game host device, wherein the request for modifying the IP comprises a local area network IP of the electronic device, and the request for modifying the IP is used to instruct the game host device to modify a gateway IP in the game host device to the local area network IP of the electronic device, wherein the gateway IP modification configures the game host device to route packets to the electronic device;

obtain game information in the game host device by the accelerator client, the game information comprising an IP and a port number of a game server, wherein the electronic device and the game host device are in a same network;

establish a game data monitoring interface according to the IP and the port number of the game server, and monitoring network data sent to the electronic device by the game host device by the game data monitoring interface;

determine game data to be accelerated corresponding to the game host device according to a monitoring result; and send the game data to be accelerated to an acceleration server.

13. A system for game data acceleration, comprising a mobile phone, a game host device, an acceleration server and a game server;

wherein, the mobile phone is configured to perform:

establishing a network connection with the game host device in a wireless mode or a wired mode by sending a request for modifying an IP to the game host device, wherein the request for modifying the IP comprises a local area network IP of the electronic device, and the request for modifying the IP is used to instruct the game host device to modify a gateway IP in the game host device to the local area network IP of the electronic device, wherein the gateway IP modification configures the game host device to route packets to the electronic device; and obtaining game information in the game host device, the game information comprising an IP and a port number of the game server, wherein the mobile phone and the game host device are in a same network;

the mobile phone is configured to perform starting an accelerator client configured in the mobile phone to establish a corresponding game data monitoring interface according to the IP and the port number of the game server, and monitoring network data sent to the mobile phone by the game host device by the game data monitoring interface;

the mobile phone is configured to perform determining game data to be accelerated corresponding to the game host device according to a monitoring result;

the mobile phone is configured to perform sending the game data to be accelerated to the acceleration server;

the acceleration server is configured to perform acceleration on the game data to be accelerated, and transmit the accelerated game data to the game server; and the game host device is configured to perform uploading the network data to the mobile phone and to receive acceleration traffic returned by the game server in response to the accelerated game data by the mobile phone.

14. The method for game data acceleration according to claim 1, wherein, the electronic device is configured with an Android system or an IOS system, and the accelerator client is a VPN service component;

the establishing a game data monitoring interface according to the IP and the port number of the game server, and monitoring network data sent to the electronic device by the game host device by the game data monitoring interface comprises:

starting the VPN service component;

establishing a game data monitoring interface according to the IP and the port number of the game server in the VPN service component, so as to simulate the game data monitoring interface as the game server and send network data to the game data monitoring interface by the game host device; and monitoring the network data by the game data monitoring interface.

15. The method for game data acceleration according to claim 6, wherein the sending the game data to be accelerated to the acceleration server further comprises:

performing a filtering and cleaning process on the game data to be accelerated via a network accelerator client.

16. The method for game data acceleration according to claim 15, wherein the filtering and cleaning process comprises at least one of:

routing configuration, domain name regular configuration, domain name blacklist configuration, domain name white list configuration, or IP configuration of P2P.

17. The method for game data acceleration according to claim 9, the establishing the first UDP game data monitoring interface further comprises:

adding an IP of a remote player dynamically.

18. The method for game data acceleration according to claim 1, wherein the acceleration server is a cloud server.

* * * * *